(12) United States Patent
Glapin et al.

(10) Patent No.: US 7,688,712 B2
(45) Date of Patent: Mar. 30, 2010

(54) SELECTING ONE OF MULTIPLE REDUNDANT NETWORK ACCESS POINTS ON A NODE WITHIN AN INDUSTRIAL PROCESS CONTROL NETWORK

(75) Inventors: Samuel Glapin, Hingham, MA (US); Alan Andrew Gale, Carver, MA (US)

(73) Assignee: Invensys Systems, Inc., Foxboro, MA (US)

( * ) Notice: Subject to any disclaimer, the term of this patent is extended or adjusted under 35 U.S.C. 154(b) by 1064 days.

(21) Appl. No.: 11/243,228

(22) Filed: Oct. 4, 2005

(65) Prior Publication Data
US 2007/0076590 A1 Apr. 5, 2007

(51) Int. Cl.
*G01R 31/08* (2006.01)
(52) U.S. Cl. .................... 370/216; 370/254
(58) Field of Classification Search .......... 370/249, 370/217, 351, 216, 242, 319, 465, 236, 254, 370/252, 221; 395/200
See application file for complete search history.

(56) References Cited

U.S. PATENT DOCUMENTS 5,778,189 A * 7/1998 Kimura et al. .......... 709/236
2004/0085894 A1 * 5/2004 Wang et al. .......... 370/216
2004/0136318 A1 * 7/2004 Bentley .......... 370/221
2005/0220033 A1 * 10/2005 DelRegno et al. .......... 370/249
2005/0232227 A1 * 10/2005 Jorgenson et al. .......... 370/351
2005/0276215 A1 * 12/2005 Kitani et al. .......... 370/217
2006/0013145 A1 * 1/2006 Boodaghians .......... 370/249
2006/0171331 A1 * 8/2006 Previdi et al. .......... 370/254
2006/0268731 A1 * 11/2006 Moore .......... 370/252

* cited by examiner

*Primary Examiner*—Kwang B Yao
*Assistant Examiner*—Syed Bokhari
(74) *Attorney, Agent, or Firm*—Leydig, Voit & Mayer Ltd.

(57) ABSTRACT

A method and network access point selection logic are described for a redundantly connected industrial LAN node including at least primary and backup network access points. Network connectivity is determined by a redundantly connected node by testing connectivity between the node's primary and backup physical network access points. Upon detecting a loss of connectivity between the redundant node's primary and backup network access points, the node executes access point selection logic, based upon tests of connectivity between the redundantly connected (primary and backup) network access points and a set of nodes on the LAN, to select a preferred/primary one of the redundant access points. Thereafter, the redundantly connected node binds its connections according to primary and backup designations for its redundant network access points.

33 Claims, 4 Drawing Sheets

| 802.3 MAC | | | 802.2 LLC | | | | |
|---|---|---|---|---|---|---|---|
| Destination MAC 400 | Source MAC 410 | Length 420 | DSAP 430 | SSAP 440 | Control 450 | Data 460 | CRC 470 |

SELECTING ONE OF MULTIPLE REDUNDANT NETWORK ACCESS POINTS ON A NODE WITHIN AN INDUSTRIAL PROCESS CONTROL NETWORK

FIELD OF THE INVENTION

This invention relates generally to networking technologies utilized by and/or incorporated within industrial process control networks and, more particularly, relates to redundant physical network configurations utilized by such networks to ensure reliable access to critical data and computing systems for monitoring and controlling industrial processes.

BACKGROUND

The IEEE 802.3/ETHERNET standard is the most popular physical layer LAN protocol in use today. Networked computing hardware incorporating and carrying out ETHERNET protocols are now utilized within industrial process control/factory networks. Such networks connect a variety of process control data sources, including control processors, to monitoring stations. Such local area networks facilitate visualization and control of industrial processes through the monitoring stations. By way of example, data received by a monitoring station drives a process visualization application providing visual output representing a current state of a plant process (e.g., temperature, pressure and/or fluid levels within tanks, mixers, reactors, etc.). Based upon such displayed information, a plant manager potentially initiates one or more of a variety of supervisory control operations (e.g., re-setting a set point, shutting down a process, etc.) with regard to the monitored plant process.

A number of ETHERNET technology enhancements build upon the basic IEEE 802.3/ETHERNET standard—including ones that support redundant, multi-path physical connectivity between nodes of a local area network infrastructure. Such ETHERNET network technology enhancements include: Rapid Spanning Tree (IEEE 802.1w), Ethernet Automatic Protection Switching (RFC 3619), Full-duplex (IEEE 802.3x), and high speed Ethernet (IEEE 802.3u, 802.3z, 802.3ae). These improvements have facilitated deploying ETHERNET LANs as highly reliable deterministic self-healing redundant networks that support bi-directional communications between sources of industrial process data (e.g., data access servers, embedded process controllers) and supervisory-level monitors for observing and controlling plant processes at a supervisory level. Furthermore, such enhancements enable redundant data path fail-over in less than a second.

In many instances nodes execute critical supervisory process control/visualization applications. Such applications present a supervisory view of an industrial process, report alarms/events, and expose controls for enabling an engineer to respond quickly to such alarms/events—even execute logic to render automated supervisory control instructions. Even in a high availability system network incorporating one or more of the above-mentioned ETHERNET technology enhancements, a node without redundant network connection access points (also referred to as ports) is a single point of failure. Therefore, to enhance reliability of communications between nodes running critical process control/visualization applications in a plant process control network, redundancy has been extended to the physical connections between such nodes and physical LANs.

In nodes having redundant network connections to a LAN, loss of a primary access point/port connecting a redundantly configured node to the LAN is detected and a transparent switch is made to the backup access point/port. One type of network connectivity test (referred to herein as end-to-end connectivity) involves confirming network connectivity between two endpoint nodes on a network that seek to communicate with one another. End-to-end connectivity between two nodes has been detected by data link (layer two) processes. For example, currently pending Burak, U.S. patent application Ser. No. 10/775,633, entitled "System and Method for Ethernet Redundancy," discloses a technique for detecting the status of a node's redundant network connection physical access ports and transparently switches from a primary network access port to a backup access port upon detecting an end-to-end failure of the primary access port. The Burak '633 application discloses performing end-to-end failure detection by layer two processes for each packet transmission according to the IEEE 802.2 Logical Link Control Type 2 or Type 3 (i.e., LLC2/LLC3) data link protocols. Therefore, in connections incorporating the above-described redundancy capabilities, when a failure in a network path between two communicating nodes is detected by a node having redundant connections to a network, the node switches its point of network access from a current primary physical port to a current backup port.

The above-mentioned end-to-end network connectivity fault detection and primary port switching techniques are intended for use in networks where network paths between two nodes are potentially incapable of deterministic healing—i.e., a path fault potentially persists for an indefinite time period. In such network environment, after a network path failure has occurred and the network potentially commences a healing process, a node retransmits its packet up to "r" times, in accordance with a reliable data link protocol, to ensure the network data path had indeed failed. If the node is unsuccessful in each of the "r" transmissions of a packet to a destination node, then the node switches its primary physical network access point to the current backup physical network access point. After switching the physical network access point, the node retransmits its packet up to "r" times using this alternate network access point. If this second set of "r" attempts fails, then the node switches back to the previous access point (for "r" more packet transmission attempts). The sets of "r" retransmissions (one set per redundant physical network access point/port) are repeated up to "n" times—ending retransmissions when the network self-heals and/or the packet is successfully received by the destination node. U.S. Pat. No. 6,173,411 discloses periodic end-to-end connectivity testing to detect end-to-end connectivity failures between network access points/ports.

The previously-mentioned enhanced ETHERNET protocols (e.g., Rapid Spanning Tree Protocol) facilitate deploying LANs with highly available, deterministic self-healing (in less than a second), network paths between attached nodes. In deterministic self-healing networks, re-configurable switches between a source node and destination node are reconfigured, in the event of a path failure, to re-route packets on a substitute path between two communicating nodes. As a consequence there is no need for the nodes themselves to implement data link layer protocols for detecting end-to-end network connectivity (since such connectivity is ensured, if at least one such path exists, by the network itself). Self-healing networks do not provide any special advantage in cases where a presently selected access point/port fails. Furthermore, a link failure may render a portion of a network inaccessible through one of a set of redundant access points.

SUMMARY OF THE INVENTION

The present invention provides a method and network access point selection logic on a redundantly connected local area network node including at least primary and backup network access points. The port selection logic facilitates effectively managing the networked node's redundant access points in view of connectivity status information provided to the node.

In accordance with the present invention, network connectivity is determined by a redundantly connected node by testing connectivity between the node's primary and backup physical network access points. Upon detecting a loss of connectivity between the redundant node's primary and backup network access points, the node executes access point selection logic, based upon tests of connectivity between the redundantly connected (primary and backup) network access points and a set of nodes on the LAN, to select a preferred/primary one of the access points. Thereafter, the redundantly connected node binds its connections according to primary and backup designations for its redundant network access points.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION

In summary of exemplary embodiments of the present invention described herein, a redundant node includes two distinct physical network access points (e.g., ports) that connect the redundant node to a LAN. In an exemplary embodiment, the LAN is a switched ETHERNET network that comprises a configurable set of switches and links redundantly arranged such that if connectivity exists, via the LAN, between the redundant node's two access points/ports, then the two access points have equal access to the other nodes on the LAN. The exemplary LAN incorporates real-time self-healing techniques to remedy connectivity failures within the physical links, that make up the LAN, within network error timeout limits of the client nodes (e.g., less than one second).

Within a self-healing network environment, end-to-end connectivity testing, incorporated into the communications stacks of the aforementioned known networked nodes, is no longer a needed task of client nodes attached to the LAN.

In contrast to the known end-to-end connectivity test schemes, the redundant node implements a connectivity test scheme that detects loss of network connectivity to the LAN, by either of the two physical network access points, by testing connectivity between the redundant node's two physical network access points via the LAN. As long as the two access points can communicate, no switching of status between redundant network access points is performed. However, if the redundant node detects a loss of connectivity between the two physical network access points (an indication that at least one of the nodes has experienced a network access failure), then access point selection logic is executed by the redundant node to determine an access point providing superior access to the LAN. By way of example, the redundant node sends test messages, through both physical network access points, to a set of physical network addresses with which the redundant node recently communicated. Success or failure is tallied for each of the test messages. Thereafter, communications between the redundant node and other nodes on the LAN are carried out via the physical network access point/port providing superior access to the other nodes on the LAN.

Figure 1:
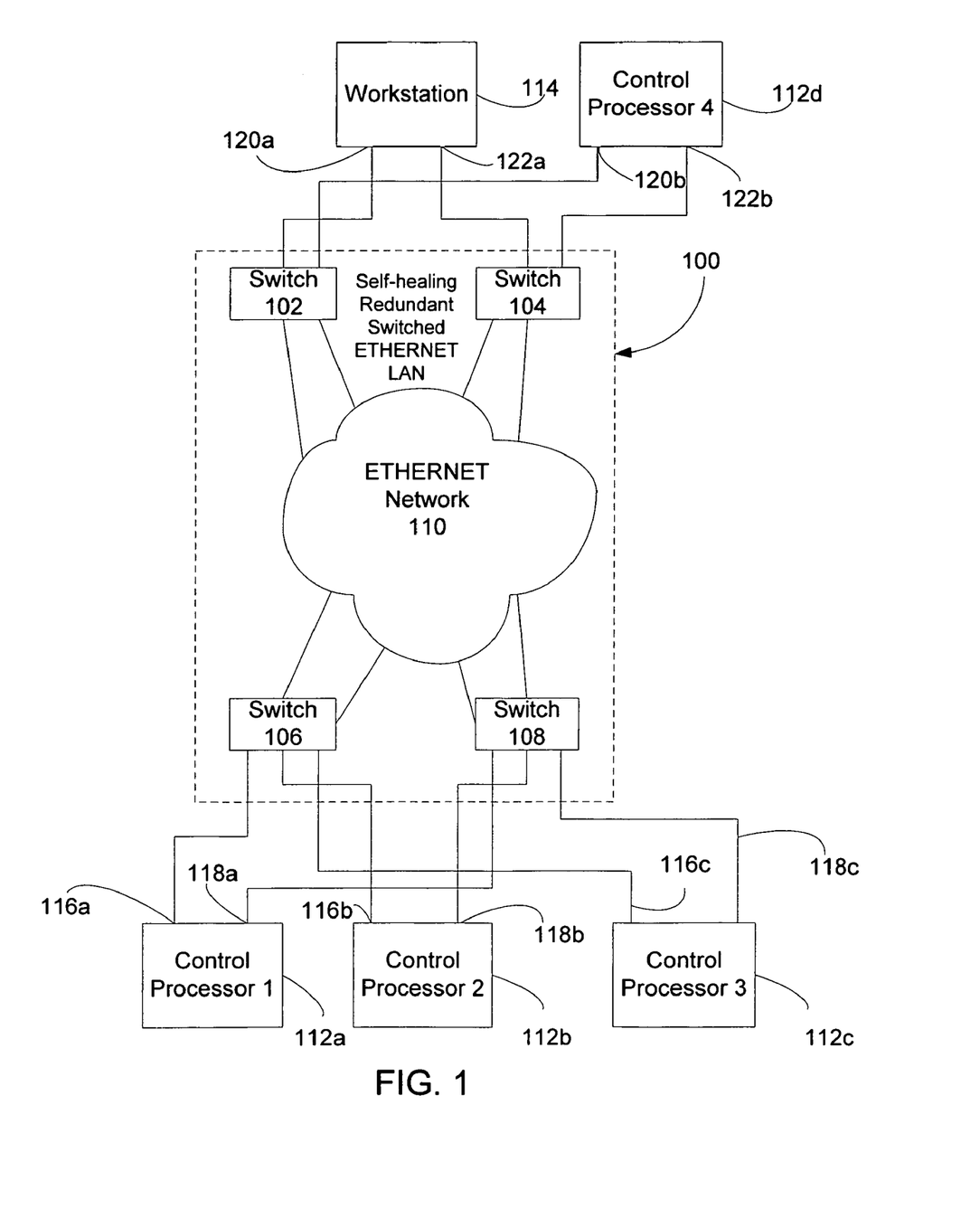
FIG. 1 is a schematic network diagram showing nodes having multiple access points connected to a redundant switched Ethernet network according to an embodiment of the invention.

Turning to FIG. 1, a self-healing switched ETHERNET LAN 100 (hereinafter LAN 100) hosts a set of nodes of an industrial/plant process control system. In the illustrative example, the LAN 100 comprises a set of redundant (ETHERNET) switches, including specifically identified edge switches 102, 104, 106 and 108 that reside at the edge of the LAN 100, and provide localized network connectivity between attached end nodes even when the edge switches are not connected to the network 110. It is noted that while the switches 102, 104, 106 and 108 are connected to a relatively small number of end node devices (e.g., workstations, control processors), alternative embodiments include edge switches including 8, 16 or even more such connections to end nodes. While not specifically depicted in the drawing, the LAN 100 potentially comprises multiple redundant switches and one or more IEEE 802.1d compliant bridges within the ETHERNET network cloud 110. The redundant switches and bridges are linked together to provide multiple potential paths between hosted nodes such as a set of control processor nodes 112a-d and a workstation node 114 in any of a variety of known self-healing redundant arrangements. The redundant self-healing ETHERNET LAN 100 is responsible for ensuring end-to-end connectivity between any two properly functioning network access points (i.e., ports) of attached nodes. Thus, the nodes hosted by the LAN 100, such as the control processors 112a-d and workstation 114, need not monitor/ensure the existence of an available physical path (i.e., end-to-end connectivity) to other nodes hosted by the LAN 100.

The LAN 100, by way of example, provides a physical medium for communicatively coupling a set of nodes, of various types, that facilitate monitoring and supervisory control of an industrial process/plant/enterprise. In the illustrative example, the set of nodes coupled to the LAN 100 includes the control processors 112a-d and workstation 114. Workstations execute a variety of process control system configuration, deployment, monitoring/visualization, and control applications. Control processors (such as the control processors 112a-d), by way of example, execute a variety of automated distributed process control programs (loops) that receive data from sensors/devices deployed in a plant, analyze the received data in view of current set points, and issue control commands to actuators on plant equipment. The set points are provided, for example, by automated supervisory process control programs as well as human input via a workstation. While not shown in the drawing, the control processors 112a-d are communicatively coupled to sub-networks that host communications between the control processors 112a-d and sources of field data (e.g., field communications modules). The sub-networks include, for example, a plurality of field communication modules. The field communication modules, in turn, comprise a portion of a field device sub-network/bus including various sensors and actuators that facilitate automated control of a industrial/plant process.

It should be understood that the LAN arrangement depicted in FIG. 1 is a simplified illustration of an exemplary network environment for carrying out the present invention. The control processors 112a-d and workstation 114 are representative of a large number of connected control processors and workstations potentially hosted by the LAN 100. Furthermore, in addition to the explicitly depicted workstation 114 and control processors 112a-d, the LAN 100 also potentially hosts gateways and data acquisition server applications, executing on yet other nodes, that provide access to process data generated by field devices (e.g., sensors, valves, actuators, etc.) at lower levels of a hierarchically arranged industrial process control network. Any of such nodes potentially include redundant physical access points to the LAN 100.

With continued reference to FIG. 1, in accordance with embodiments of the present invention, network redundancy support extends to physical network access points between the edge switches 102, 104, 106 and 108 of the LAN 100 and the end nodes, such as the control processors 112a-d and the workstation 114. In the illustrative embodiment, the physical network access points of the control processors 112a-c include a first set of physical ports 116a-c and a second set of second physical ports 118a-c. The physical network access points of the workstation 114 include a first physical port 120a and a second physical port 122a. The control processor 112d is coupled to edge switches 102 and 104 via a first physical port 120b and a second physical port 122b. In a particular exemplary embodiment, the first physical ports 116a-c, 120a-b and second physical ports 118a-c, 122a-b that couple the control processors 112a-d and workstation 114 to the LAN 100 comprise, by way of example, IEEE 802.3 ETHERNET ports. Furthermore, the redundant physical ports of the control processors 112a-d and the workstation 114 are connected to distinct LAN switches to achieve network path redundancy.

The first and second physical ports for each redundantly connected node are used in a variety of ways in accordance with various embodiments of the invention. By way of example, the first and second network access points associated with a node having redundant access to the LAN 100 are assigned primary/backup status (also known as active/standby status assignments). In such role-based embodiments, the primary network access point supports communications for the applications executing on the node. The backup network access point merely participates in communications status and upkeep aspects of the node. However, in alternative embodiments, where additional throughput is desired, both network access points are simultaneously used to support communications associated with applications executed on the node. Thus, the first and second (redundant) network access points/ports are utilized differently during non-fault situations in accordance with various embodiments of the invention.

It will be appreciated by those skilled in the art that industrial process control networks are carried out in a variety of topologies/configurations. The portion of a process control network depicted in FIG. 1 is intended to illustrate a potential network environment within which the present invention is potentially incorporated to enhance the overall reliability of communications between nodes in a deterministic self-healing network. Therefore, any number and types of machines may be interconnected on a network embodying the connectivity testing and node selection, and the illustrated configuration is merely an example.

Furthermore, the invention is generally described with reference to acts/operations performed by one or more computing devices/systems, unless indicated otherwise. It will be appreciated that such acts and operations comprise manipulation by the computing device/system of signals representing data in a structured form, transforming the data or maintaining it at locations to alter the operation of the computing device/system. Moreover, it will be appreciated that many of the functions and operations described herein are executed based on computer-executable instructions read from a computer-readable medium or media. Such media include storage media, such as electrical, magnetic, or optically encoded media, as well as transportation media, such as a modulated electrical signal on an appropriate carrier medium.

Figure 2:
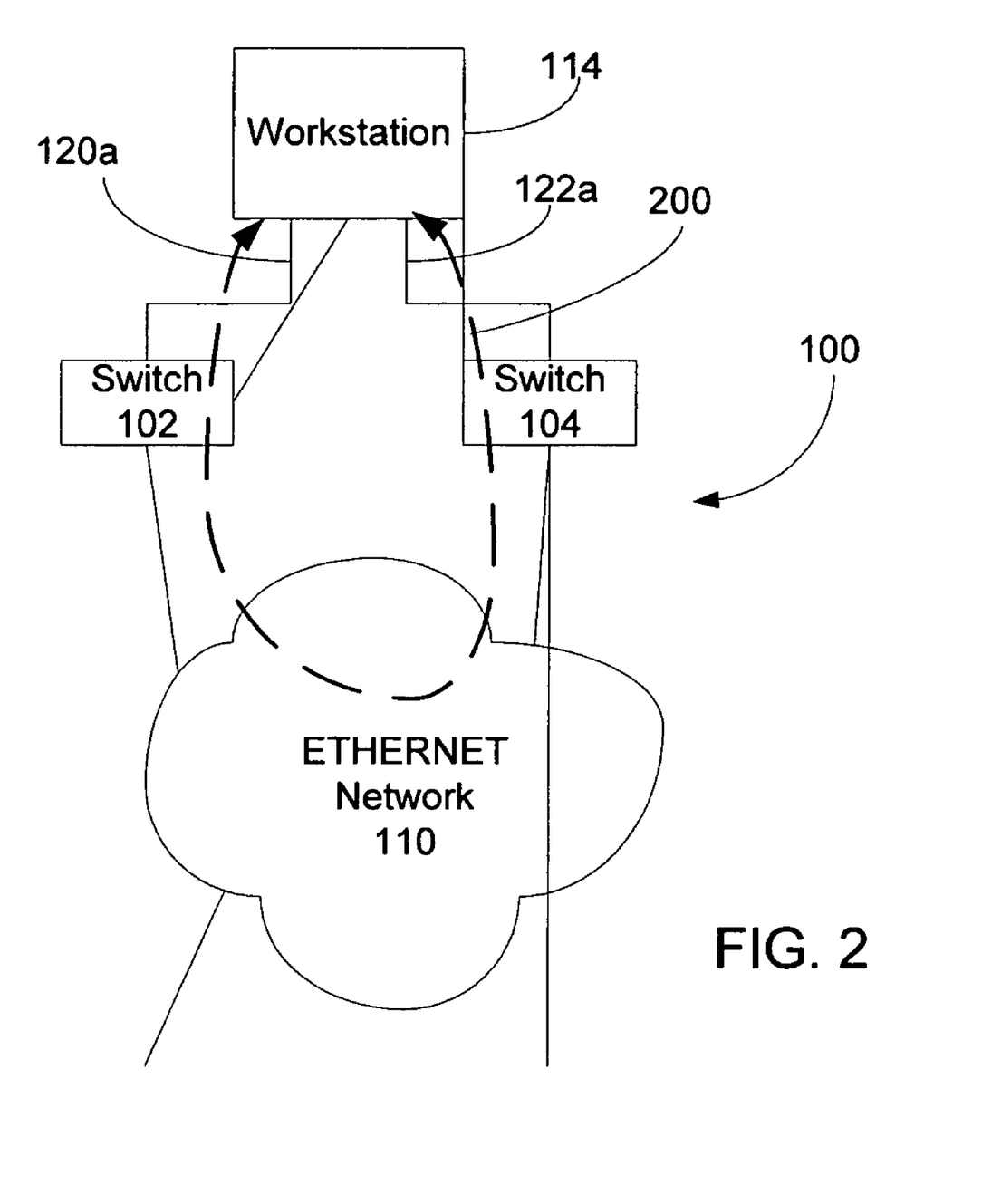
FIG. 2 is a schematic diagram of a portion of the network depicted in FIG. 1 illustratively depicting a communications test performed by a redundantly connected node on the network.

An aspect of an embodiment of the present invention concerns testing for the existence of a physical communications path between a pair of network access points for a redundantly connected node on a LAN. As depicted in FIG. 2, the workstation 114 carries out a primary communications test on its redundant network access points 120a and 122a wherein, as indicated by the dashed path 200 in FIG. 2, test messages are sent by one redundant access point (e.g., 120a) on the workstation 114 to the other redundant access point (e.g., 122a) on the workstation 114. Sending out the test message (described further herein below with reference to FIG. 4), by either one of the redundant network access points 120a and 122a, and registering a response message, enables the workstation 114 to detect loss of a network path between the two redundant network access points.

The quantity and nature of actual message transmissions involved in the primary communications test varies in accordance with embodiments of the invention. In an exemplary embodiment a request/reply network messaging scheme is utilized wherein either of the two access points initially transmits a test request, and in response the receiving access point issues a test reply. In other embodiments, the primary communications test includes the issuer of the test request sending yet another message, in response to receiving the test reply. The three-message primary test sequence confirms the existence of a fully functional bi-directional path between the two access points of a node redundantly connected to a network. In yet other embodiments, since both access points reside on the same machine, the test reply is not transmitted via the LAN 100. Instead, notification mechanisms within the workstation 114 confirm successful reception, at a receiving port (e.g., network access point 122a), of a test request issued from a transmitting port (e.g., network access point 120a). The single message test scheme does not verify bi-directional communication functionality. However, the aforementioned notification mechanisms are utilized in yet other embodiments to confirm the existence of a fully functional bi-directional path using only a test request and a test reply—or via separate tests initiated by issuing a test request from each redundant network access point of a node (and internally registering reception of the request message at a location accessible by the sender of the request message).

Another aspect of a connectivity test scheme embodying the present invention involves responding to success/failure of the aforementioned primary communications test. In a redundant self-healing LAN environment, the existence of the path between the two access points indicates that each of the two access points has equal ability to reach other nodes on the LAN 100. Therefore, if the primary communications test is successful, then no access point/port configuration processing is initiated in response to the current iteration of the primary communications test.

Conversely, a failure registered during the primary communications test indicates that at least one of the two access points of the workstation 114 has lost connectivity to at least a portion of the LAN 100 infrastructure. In accordance with exemplary embodiments, when the workstation 114 senses the absence of a communications path between the two redundant network access points 120a and 122a, the workstation 114 issues secondary communication test messages from each of its network access points 120a and 122a to other nodes on the LAN 100. Based upon the secondary communications test results, the workstation 114 network interfaces are configured such that the network access point having superior connectivity to the network is assigned a primary designation, and the remaining network access point(s) are designated as backup. Thus, if the backup access point is determined to have superior access to other nodes on the network, then its status is changed to primary. Handling a tie during the secondary communications test is discussed herein below.

Loss of connectivity between two redundant network access points for an end node (e.g., workstation 114) indicates multiple faults in the network. In accordance with an aspect of the disclosed embodiment the end node continues to test the connections after losing connectivity between its redundant network access points until such connectivity is restored. As will be explained further herein below, such retesting on a failed connection between an end node's redundant ports allows a set of stations attached to a same edge switch to potentially cascade over (e.g., re-designate their primary port) to the best network path/edge switch when multiple stations have limited access through virtue of local connectivity supplied by an edge switch between the end nodes connected to the edge switch.

Cascading multiple end nodes to a better-connected edge switch is further facilitated by re-designating primary/backup port designations once in response to a tie with regard to the number of responses received during the secondary communications test. Using the configuration depicted in FIG. 1 as an example, a tie may occur when a station is in communication with four stations—two responding end nodes connected to the same edge switch and two responding end nodes further into the network. For purposes of explanation assume that access point 116a of control processor 112a is only able to connect to (and obtain responses from) other stations in the same edge switch 106, and access point 118a connects to the entire network (through edge switch 108). This could occur due to switch 106 failing both uplink ports into the network 110. The first pass of testing will result in the control processor 112a getting two responses on access point 116a (from responding control processors 112b and 112c) and two on access point 118 (from Workstation 114 and control processor 112d). If the control processor 112a does not re-designate primary/backup port designations in response to the tie, then the three local stations could remain isolated from the other two stations in the network. Switching primary/backup redundant port designations in response to a tie potentially overcomes the above-described islanding by allowing stations to move from an isolated access point to an access point with equal connectivity. If no other node changes designations, then the control processor 112a will continue to experience ties. However, the re-designation of the primary/backup ports in the control processor 112a may eliminate a tie experienced by one or more of the other nodes coupled to an edge switch—potentially initiating a re-designation of primary/backup port assignments for the other end nodes. Thus, the remaining stations/end nodes on the isolated edge switch 106, in the illustrative example, will execute an iteration of the secondary communications test and potentially re-designate their primary network connections from edge switch 106 to edge switch 108. Connectivity between all the end nodes is potentially restored as a consequence of implementing the above-described tie-breaker once on the control processor 112a with the remaining end nodes following the control processor 112a in re-designating primary/backup ports.

Multiple faults in the network can result in permanently isolated end nodes and thus continuous "tie" situations. Switching primary/backup port designations only once in response to a tie (of the secondary test) after detecting loss of connectivity between redundant network ports on an end node potentially eliminates such ties and avoids continuous hunting between the networks. After the single switch of primary/backup port designations, the ability of an end node to switch on a tie, of the secondary test, is re-enabled after connectivity is restored between the end node's two access points.

It is noted that the primary/backup roles create a preference of one network access point (the primary) over the other (the backup). However, this does not necessarily result in shutting down the backup network access point or placing it in a standby state. For example, in an embodiment of the invention, the primary network access point is the preferred recipient/sender of messages from/to other nodes on the network. However, if a particular node is determined to be inaccessible to the primary network access point, then the backup node is used as the sender/recipient of packets to/from nodes that are known to be inaccessible to the primary network access point. The backup node, at a minimum, carries out communications in support of the primary and secondary tests described herein.

Figure 3:
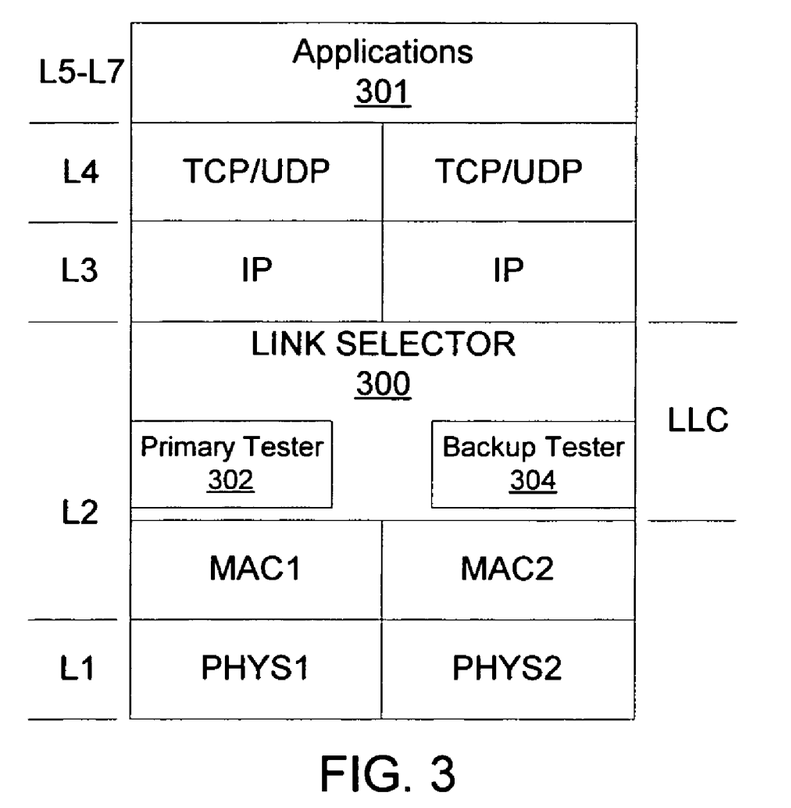
FIG. 3 is an exemplary multi-communications stack arrangement (according to the well known OSI model) incorporated into a redundantly connected node embodying the present invention.

Turning to FIG. 3, in embodiments of the invention, a network access point accessibility testing and link selection mechanism (link selector 300) is implemented at a data link layer (L2), and in particular a logical link control sub-layer, of the Open System Interconnect (OSI) network protocol stack architecture. The logical link control sub-layer includes functionality for managing data flow and error control over the physical medium. It is noted that in alternative embodiments, the testing and link/connection selection mechanism is implemented, in part, at higher levels (e.g., Network layer (L3)) of the network communications protocol stack. The network access point accessibility testing and link selection mechanism (link selector 300) operates across/upon (i.e., combines) information concerning all physical network access points supported by the redundantly connected node on a same network. Furthermore, the testing and selection mechanism described herein potentially operates in conjunction with other network access point testing/selection protocols and, by way of example, replaces (or alternatively supplements) the reliable data link (e.g., IEEE 802.2 Logical Link Control Type 2/3) functionality disclosed in Burak, U.S. patent application Ser. No. 10/775,633, entitled "System and Method for Ethernet Redundancy." The contents of the Burak '633 application are explicitly incorporated herein by reference in their entirety, including the contents of any references (e.g., referenced network communications standards) contained therein. The dual stack representation in FIG. 3 corresponds, by way of illustrative example, to the workstation 114 comprising a set of two redundant network access points 120a and 122a.

With continued reference to the linked protocol stacks of the redundantly connected workstation 114 illustratively depicted in FIG. 3, each network access point is associated with a distinct physical network interface (e.g., ETHERNET network interface cards). In the illustrative embodiment, the two network access points 120a and 122a of the workstation 114 are defined/specified at a physical layer (L1) by distinct network interfaces PHYS1 and PHYS2. PHYS1 and PHYS2 thus correspond to distinct physical connections between the workstation 114 and the LAN 100 at the network access points 120a and 122a.

The data link layer (L2) is divided into medium access control (MAC) and logical link control (LLC) sub-layers. The MAC sub-layer distinguishes an access point from other access points physically connected to the LAN. To that end, each network access point is assigned a distinct MAC address. In the illustrative embodiment set forth in FIG. 3, media access control components MAC1 and MAC2 correspond to the distinct network addresses assigned to network access points 120a and 122a of the redundantly connected workstation 114. The media access control addresses facilitate designating unique physical source and destination addresses for messages passed between the redundant network access points 120a and 122a of the workstation 114. Furthermore, the MAC sub-layer and physical layer cooperatively sense loss of connectivity of a network access point to a link.

With continued reference to the illustrative stack architecture depicted in FIG. 3, the two protocol stacks, corresponding to network access points 120a and 122a of the redundantly connected workstation 114, are integrated/combined at the LLC sub-layer of the data link layer (L2)—a sub-layer concerned with managing data flow and error control over associated physical network connections. Such integration, which is potentially implemented/carried out by a single process/thread or multiple processes/threads operating in concert, facilitates coordinating testing network accessibility, analyzing testing results, designating primary/backup statuses to the network access points 120a and 122a for the redundantly connected workstation 114, and supporting connections maintained by higher layers of the protocol stack (to the multiple potentially available network access points, based upon the designated statuses of the network access points). In accordance with alternative embodiments, services at the LLC sub-layer level are either connection-oriented or connectionless depending upon the LLC sub-layer type (type 2 or 3) implemented within the data link layer.

In accordance with exemplary embodiments, in addition to performing connectivity testing, processes operating at the logical link control sub-layer assign/bind/re-bind logical connections maintained at upper layers (e.g., layers L3 through L7 of the OSI model) of a protocol stack to one of a set of alternative physical connections supported by a node. Thus, the remaining layer components of each network protocol stack (e.g., OSI layers L3 through L7) are not permanently bound to the lower layers. Instead in an exemplary embodiment, the link selector 300, dynamically designates which of the redundant physical layer (L1) components (PHYS1 and PHYS2) and MAC sub-layer components (MAC1 and MAC2) handle connections/sessions/applications associated with components on the workstation 114 corresponding to the upper layers (L3-L7) of the dual/integrated protocol stack and routes messages accordingly. Such handling is performed at any of a variety of persistence levels, including on a message/packet basis.

In accordance with an illustrative embodiment, the link selector 300, embodying network interface selection logic described herein, is positioned within the dual/integrated protocol stack architecture of the workstation 114 in a manner similar to the reliable data link layer (e.g., IEEE 802.2 LLC Type 2 or 3) functionality described previously in Burak, U.S. patent application Ser. No. 10/775,633, entitled "System and Method for Ethernet Redundancy." The link selector 300 includes logic for designating a current primary/backup status to the PHYS1 and PHYS2 network interface components based upon the results of network connectivity tests described herein.

Furthermore, the link selector 300 incorporates functionality to transparently re-assign/re-bind network layer (L3) connections to one of the MAC sub-layer components (e.g., MAC1 and MAC2) according to its status designations for the physical layer connections (e.g., PHYS1 and PHYS2). However, in contrast to the LLC sub-layer component described in the '633 application, end-to-end connectivity testing is performed by LLC sub-layer components as a secondary test in response to a primary test failure, wherein the primary test failure indicates a network communication path does not exist between the redundant network access points 120a and 122a of the redundantly connected workstation 114.

In accordance with an exemplary embodiment, a primary tester 302 and a backup tester 304 operate in association with the link selector 300 to carry out network communications path testing and network interface selection protocols. The primary tester 302 and backup tester 304 initiate sending primary communications test request/response messages on behalf of their respective assigned network access points (e.g., access points 120 and 122) during the aforementioned primary communications test.

Furthermore, in the event of a failed primary test, the primary tester 302 and backup tester 304 operate in association with the link selector 300 to carry out the secondary test to determine which one of the network access points (120a and 122a) has better connectivity. The network access point with better connectivity to other nodes in the network is designated, by the link selector 300, as the primary network access point. The appropriate upper-layer (L3-L7) components are bound to MAC layer components based upon the designated primary/backup statuses assigned to the redundant network access points 120a and 122a) according to the link selector 300's designation.

The criterion implemented by the link selector to determine the network access point can be any of a variety tests. However, in an embodiment of the secondary test, each network access point (120a and 122a) attempts to communicate with a designated set of nodes to which the workstation previously communicated. The link selector 300 compares the relative success of each network access point (120a and 122a) to reach the designated set of nodes. The network access point having a greater degree of success (e.g. the one with a greater number of successful replies) is designated as the primary network access point. As noted above, in the case of equal success, the link selector 300 switches once then leaves the current primary/backup designations unchanged.

In an embodiment of the redundant network access point testing and selection method and system the above-mentioned connectivity and network access point selection operations are transparent to the operation of the remaining layers (L3 to L7). In the illustrative embodiment, TCP/UDP/Internet protocol packets are created/processed at the network layer (L3) and transport layer (L4) of the dual stack without regard to the actual network access point through which the packets will be ultimately transmitted.

Applications 301 are shown as a single, undivided group that sits above transport layer (L4) components. This is intended to illustratively depict the potential of applications/users to dynamically (e.g., at runtime) designate/select and thereafter bind to a particular network protocol stack—at least at the upper layers (L3 and L4). Alternatively, the applications 301 are statically bound, through pre-configuration, to a particular one of multiple available communications sub-stacks (comprising L3 and L4 components). In either case, the physical network access point that ultimately is delegated to handle network communications associated with an application is determined by operation of the link selection algorithms carried out by the link selector 300 in view of the primary and secondary tests performed by the primary and backup testers 302 and 304.

Figure 4:
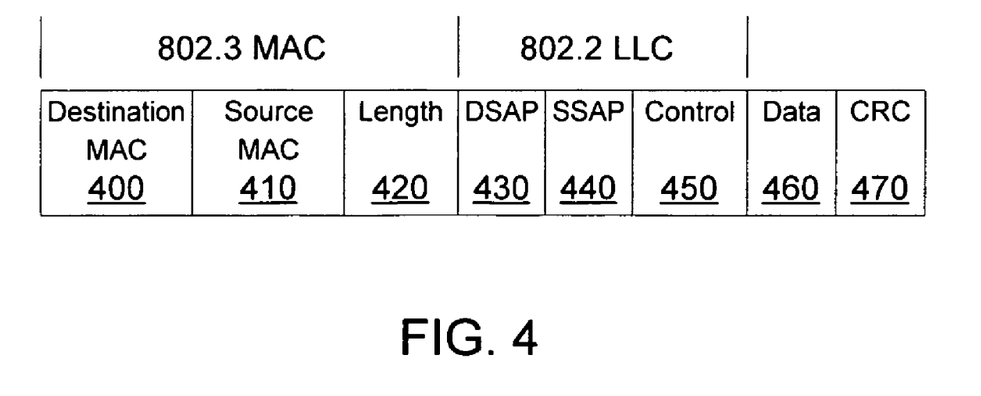
FIG. 4 is an exemplary test request/reply frame format.

Turning to FIG. 4, the data link level testing performed at the data link level (L2) by the link selector task 300, is carried out via message information encapsulated within ETHERNET fields contained within transmitted packets. By way of example, in embodiments of the present redundant network access point selection method, each one of a set of redundant network access points is uniquely identified by a MAC address. The exemplary (Ethernet) test frame format, depicted in FIG. 4, includes a destination MAC address 400 and a source MAC address 410 identifying the intended physical destination and source of a packet. In the exemplary embodiments the destination/source MAC addresses 400 and 410 are six bytes each. A destination access point listens for Ethernet frames specifying a destination MAC address value assigned to the destination access point. This address is generally hard-wired in each access point and is globally unique. The source MAC address 410 facilitates identifying a sender of a particular Ethernet frame. The recipient of an Ethernet frame swaps the source and destination MAC addresses in a received frame to generate a set of MAC address fields for a response. A length field 420 specifies a byte length of the Ethernet frame.

A logical link control portion of the exemplary Ethernet frame used to carry out the connectivity testing described herein includes three bytes consisting of: a destination service access point (DSAP) byte 430, a source service access point (SSAP) byte 440, and a control byte 450. A service access point specifies a logical point at which services are provided. Typically, protocols at the network/IP layer bind at specific SAPs in the LLC sub-layer of L2. In an exemplary embodiment of the present invention, the connectivity tests are designated by a value of 0x0A for the DSAP of a request frame and the SSAP for a reply frame. The control byte 450 is assigned a value of "0" for the request and a value of "1"for a reply. Thus, in an exemplary embodiment the control field is used by the primary and backup testers 302 and 304 to identify test requests/replies.

Finally, the payload portion of the Ethernet frame comprises a data section 460 (43-60 bytes) and a cyclic redundancy code (CRC) segment 470.

Figure 5:
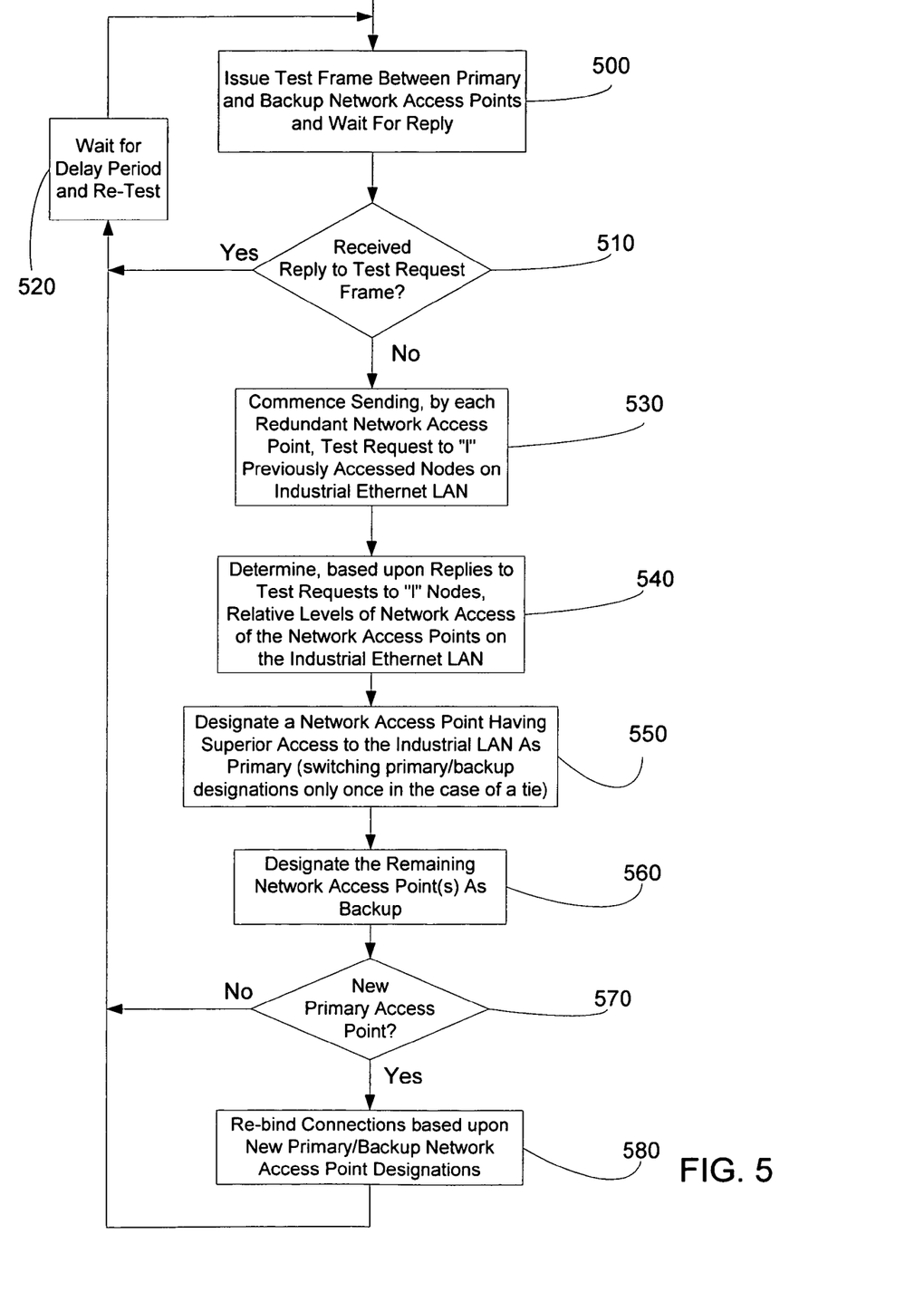
FIG. 5 is a flowchart summarizing the operation of the LLC layer of a redundantly connected node on an Industrial Ethernet LAN to determine a primary network access point and designate remaining network access points on the node as backup.

Turning to FIG. 5, a flowchart summarizes a sequence of steps associated with an exemplary method of testing connectivity of redundant network access points on a node embodying the present invention. The illustrative example comprises a half-duplex testing methodology wherein both primary and backup network access points initiate a primary test by issuing a test request frame. By issuing requests from both primary and backup ports, the link selector 300 is provided additional information for determining the source of any errors resulting in a primary test failure.

During step 500, a first redundant network access point (either one of the primary and backup network access points on a node) sends a test request frame. Thereafter, the sending network access point waits a pre-configured time period "t" to receive a reply frame from the intended recipient of the test request frame. At step 510 if a reply is received by the sender of the test request frame within the time period, then control passes to step 520. It is noted that since the link selector 300 operates across both redundant network access points (e.g., 120*a* and 122*a*), in an alternative embodiment, the recipient of the test request merely informs the link selector 300 that the request was received rather than sending a reply frame. However, in this alternative embodiment, testing the full, bi-directional communications, functionality of the redundant network access points on a node requires both the primary and backup network access points to issue test requests. Upon confirming the bi-directional communications capabilities of the primary and backup network access points, control passes to step 520 wherein a delay period is carried out (e.g., 200 milliseconds) before re-executing the redundant network access point communications test at step 500.

If a reply message is not received by the issuer of the test request frame during the pre-configured wait period, then control passes from step 510 to step 530. At step 530 both redundant network access points commence a secondary test to determine which one of the network access points has superior connectivity. By way of example, during step 530, the primary and backup testers (e.g., testers 302 and 304) operating at the logical link control layer issue secondary test requests to the last "1" distinct nodes in the industrial Ethernet LAN with which the redundantly connected node communicated. The receiving nodes respond with a test reply frame. In embodiments of the invention "1" is an odd value (e.g., 5 or 7 most recently contacted end nodes). However, even and larger values are used in alternative embodiments.

During step 540, the link selector 300 determines the relative levels of access to the Ethernet LAN for each of the redundant network access points based upon the results of the tests conducted during step 530. By way of example, the relative level of access of a network access point is determined by the number of successful replies to the "1" test requests. In more complex access level testing schemes, weights are applied to the responses (e.g., more recently used nodes are given greater weight, more frequently accessed nodes are given greater weight, response times are compared, etc.) to supplement simply tallying the number of responses received by each of the redundant nodes to the "1" test request frames.

At step 550 the link selector 300 designates network access point, having superior network access level (as determined during step 540), as the primary network access point for the redundantly connected node. In the case of a tie between access levels for a previously designated primary network access point and a previously designated backup network access point (in an end node having two network access points), one switchover is performed. After switching the primary/backup designations once (to potentially handle an islanding situation), the currently designated primary network access point retains its primary status.

At step 560 the remaining network access point(s) are designated as backup network access points. Thereafter, at step 570, if the primary network access point was a backup network access point prior to step 550, then control passes to step 580 wherein connections are re-bound to appropriate network access points based upon the new primary/backup status assigned to each network access point. All connections previously bound to the previous primary network access point are re-bound to the new primary network access point. Furthermore, connections are bound to the newly designated backup access point in accordance with its new, backup status. Re-binding connections to a newly designated network interface is performed at the LLC level (and below) and is carried out transparently (i.e., without notification) to processes operating above the LLC layer of the exemplary protocol stack arrangement depicted in FIG. 3. Control then passes from step 580 to step 520. If the old primary access point is the same as the access point designated (during step 550) as the current primary access point, then re-binding connections is not necessary and therefore control passes from step 570 to step 520.

It will be appreciated that the Ethernet redundancy solution described above offers many advantages in embodiments of the invention, including providing end-to-end industrial redundant link connectivity using commercial off-the-shelf network components and equipment, using alternative links and paths on the same network for redundancy, providing automatic recovery, providing compatibility with standard or proprietary network protocols, providing interoperability to end-stations/nodes that are not using this particular Ethernet redundancy solution, allowing applications to write to standard APIs (such as Berkley socket interfaces), allowing manual switchover such as by an administrator, allowing alternate (non-primary) stacks to also have link redundancy, and allowing multiple stacks to share a single physical network interface/access point.

However, the structures, techniques, and benefits discussed above are related to the described exemplary embodiments of the invention. In view of the many possible embodiments to which the principles of this invention may be applied, it should be recognized that the embodiments described herein with respect to the drawing figures are meant to be illustrative only and should not be taken as limiting the scope of invention. For example, those of skill in the art will recognize that some elements of the illustrated embodiments shown in software may be implemented in hardware and vice versa or that the illustrated embodiments can be modified in arrangement and detail without departing from the spirit of the invention. Moreover, those of skill in the art will recognize that although Ethernet has been discussed herein as an exemplary network type for implementation of embodiments of the invention, the disclosed principles are widely applicable to other network types as well. Therefore, the invention as described herein contemplates all such embodiments as may come within the scope of the following claims and equivalents thereof.

What is claimed is:

1. A method, performed by a computer including a physical computer-readable medium including computer-executable instructions, for managing a set of network access points maintained by a single redundantly connected node on an industrial local area network (LAN) comprising the steps of:
   primarily testing bi-directional communicative connectivity, via the LAN, between a primary and a backup redundant network access point of the set of network access points;
   secondarily testing, upon determining loss of communicative connectivity between the primary and backup network access points, connectivity between the set of network access points and a set of nodes on the LAN to which the redundantly connected node previously communicated;
   designating a current primary network access point based upon results of the secondarily testing step; and
   binding a first set of connections to the current primary network access point, wherein the first set of connections are re-bound to a newly designated current primary network access from a previous primary network access point in the event that the current primary network access point specified during the designating step differs from a previously designated primary network access point.

2. The method of claim 1 wherein the secondarily testing step comprises determining a number of responses received by each one of the set of network access points and, upon detecting a first tie in the number of received responses after detecting loss of connectivity during the primarily testing step, designating a new primary network access point during the designating step in response to detecting the first tie.

3. The method of claim 2 wherein the designating a new primary network access point step is performed only in response to detecting the first tie after detecting a loss of bi-directional connectivity between primary and backup redundant network access points during the primarily testing step.

4. The method of claim 1 wherein the secondarily testing step comprises sending test request messages to a set of most recently accessed nodes on a network.

5. The method of claim 4 wherein the set of nodes receiving request messages are determined by accessing a most recently used address list.

6. The method of claim 4 wherein an odd number of secondary test request messages are sent out by the primary and backup redundant network access points.

7. The method of claim 1 wherein the binding step is transparent to applications.

8. The method of claim 7 wherein the primarily and secondarily testing steps are carried out transparent to applications.

9. The method of claim 7 wherein the primarily and secondarily testing steps are carried out transparent to network layer processes.

10. The method of claim 1 wherein the LAN incorporates ETHERNET protocols.

11. The method of claim 1 wherein the primarily testing step comprises sending a request message between from the primary network access point and the backup network access point and receiving a reply message within a time period.

12. The method of claim 1 wherein the designating the current primary network access point is based upon tallied responses by the set of nodes, to which the redundantly connected node previously communicated, to test requests issued via the primary and backup network access points, respectively.

13. The method of claim 1 wherein the primarily and secondarily tests are carried out via logical link control layer communication protocol components.

14. A computer-readable medium including computer executable instructions for facilitating managing a set of network access points maintained by a single redundantly connected node on an industrial local area network (LAN), the computer executable instructions facilitating performing, by the single redundantly connected node;
   primarily testing bi-directional communicative connectivity, via the LAN, between a primary and a backup redundant network access point of the set of network access points;
   secondarily testing, upon determining loss of communicative connectivity between the primary and backup network access points, connectivity between the set of network access points and a set of nodes on the LAN to which the redundantly connected node previously communicated; and
   designating a current primary network access point based upon results of the secondarily testing step; and binding a first set of connections to the current primary network access point, wherein the first set of connections are re-bound to a newly designated current primary network access from a previous primary network access point in the event that the current primary network access point specified during the designating step differs from a previously designated primary network access point.

15. The computer-readable medium of claim 14 wherein the secondarily testing step comprises determining a number of responses received by each one of the set of network access points and, upon detecting a first tie in the number of received responses after detecting loss of connectivity during the primarily testing step, designating a new primary network access point during the designating step in response to detecting the first tie.

16. The computer-readable medium of claim 15 wherein the designating a new primary network access point step is performed only in response to detecting the first tie after detecting a loss of bi-directional connectivity between primary and backup redundant network access points during the primarily testing step.

17. The computer-readable medium of claim 14 wherein the secondarily test comprises sending test request messages to a set of most recently accessed nodes on a network.

18. The computer-readable medium of claim 17 wherein the set of nodes receiving request messages are determined by accessing a most recently used address list.

19. The computer-readable medium of claim 17 wherein an odd number of secondary test request messages are sent out by the primary and backup redundant network access points.

20. The computer-readable medium of claim 14 wherein the primarily test comprises sending a request message between from the primary network access point and the backup network access point and receiving a reply message within a time period.

21. The computer-readable medium of claim 14 wherein the designating the current primary network access point is based upon tallied responses by the set of nodes, to which the redundantly connected node previously communicated, to test requests issued via the primary and backup network access points, respectively.

22. A node supporting redundant connectivity to an industrial local area network (LAN), the node comprising:
a set of network access points for redundantly connecting the node to the industrial LAN; and
primarily testing bi-directional communicative connectivity, via the LAN, between a primary and a backup redundant network access point of the set of network access points;
secondarily testing, upon determining loss of communicative connectivity between the primary and backup network access points, connectivity between the set of network access points and a set of nodes on the LAN to which the redundantly connected node previously communicated;
designating a current primary network access point based upon results of the secondarily testing step; and
binding a first set of connections to the current primary network access point, wherein the first set of connections are re-bound to a newly designated current primary network access from a previous primary network access point in the event that the current primary network access point specified during the designating step differs from a previously designated primary network access point.

23. The node of claim 22 wherein the secondarily testing step comprises determining a number of responses received by each one of the set of network access points and, upon detecting a first tie in the number of received responses after detecting loss of connectivity during the primarily testing step, designating a new primary network access point during the designating step in response to detecting the first tie.

24. The node of claim 23 wherein the designating a new primary network access point step is performed only in response to detecting the first tie after detecting a loss of bi-directional connectivity between primary and backup redundant network access points during the primarily testing step.

25. The node of claim 22 wherein the secondarily test comprises sending test request messages to a set of most recently accessed nodes on a network.

26. The node of claim 25 wherein the set of nodes receiving request messages are determined by accessing a most recently used address list.

27. The node of claim 25 wherein an odd number of secondary test request messages are sent out by the primary and backup redundant network access points.

28. The node of claim 22 wherein the binding step is transparent to applications running on the node.

29. The node of claim 28 wherein the primarily and secondarily testing steps are carried out transparent to applications executing on the node.

30. The node of claim 28 wherein the primarily and secondarily testing steps are carried out transparent to network layer processes.

31. The node of claim 22 wherein the primarily testing comprises sending a request message between from the primary network access point and the backup network access point and receiving a reply message within a time period.

32. The node of claim 22 wherein the designating the current primary network access point is based upon tallied responses by the set of nodes, to which the redundantly connected node previously communicated, to test requests issued via the primary and backup network access points, respectively.

33. The node of claim 22 wherein the primarily and secondarily testing steps are carried out via logical link control layer communication protocol components.

* * * * *

UNITED STATES PATENT AND TRADEMARK OFFICE
CERTIFICATE OF CORRECTION

PATENT NO. : 7,688,712 B2 Page 1 of 1
APPLICATION NO. : 11/243228
DATED : March 30, 2010
INVENTOR(S) : Samuel Galpin and Alan Andrew Gale It is certified that error appears in the above-identified patent and that said Letters Patent is hereby corrected as shown below:

On the Title page

Item [12] "Glapin et al." should be --Galpin et al.--.

Item [75] Inventor "Samuel Glapin" should be --Samuel Galpin--.

Signed and Sealed this

Eighteenth Day of May, 2010

David J. Kappos
*Director of the United States Patent and Trademark Office*